United States Patent
Ahmet

(10) Patent No.: US 12,004,200 B2
(45) Date of Patent: Jun. 4, 2024

(54) SYSTEMS AND METHODS FOR BROADCAST CONTROL CHANNEL POWER BOOST SCHEDULING FOR WIRELESS COMMUNICATIONS BASE STATIONS

(71) Applicant: T-Mobile Innovations LLC, Overland Park, KS (US)

(72) Inventor: Jeff Xhevdet Ahmet, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 304 days.

(21) Appl. No.: 17/651,170

(22) Filed: Feb. 15, 2022

(65) Prior Publication Data

US 2023/0262732 A1 Aug. 17, 2023

(51) Int. Cl.
*H04W 72/30* (2023.01)
*H04W 72/0446* (2023.01)
*H04W 72/1263* (2023.01)
H04W 84/06 (2009.01)

(52) U.S. Cl.
CPC ....... *H04W 72/30* (2023.01); *H04W 72/0446* (2013.01); *H04W 72/1263* (2013.01); *H04W 84/06* (2013.01)

(58) Field of Classification Search
CPC ............. H04W 72/30; H04W 72/0446; H04W 72/1263; H04W 84/06
See application file for complete search history.

(56) References Cited

U.S. PATENT DOCUMENTS

| | | | | |
|---|---|---|---|---|
| 2011/0243034 A1* | 10/2011 | Yamada | ................ | H04W 72/23 370/254 |
| 2013/0301576 A1* | 11/2013 | Miki | ...................... | H04L 5/006 370/329 |
| 2014/0003385 A1* | 1/2014 | Dinan | .................... | H04L 5/001 370/329 |
| 2014/0064240 A1* | 3/2014 | Dinan | .................. | H04W 72/23 370/330 |
| 2015/0071203 A1* | 3/2015 | Lee | ....................... | H04L 5/0044 370/329 |
| 2016/0205664 A1* | 7/2016 | Zhang | .............. | H04W 72/0453 370/312 |

(Continued)

*Primary Examiner* — Jael M Ulysse
(74) *Attorney, Agent, or Firm* — Shook, Hardy & Bacon L.L.P.

(57) ABSTRACT

Systems and methods for broadcast control channel power boost scheduling for wireless communications base stations are provided. In one embodiment, a method comprises transmitting a downlink wireless communication frame from a base station to UE within a coverage area, the downlink wireless communication frame comprising a first bandwidth divided into a first plurality of resource blocks; determining when a slot of the frame is scheduled to carry a downlink broadcast control channel; when the slot is not scheduled to carry the downlink broadcast control channel, scheduling the first plurality of resource blocks for the slot; when the slot is scheduled to carry the downlink broadcast control channel, scheduling fewer resource blocks than the first plurality of resource blocks for the slot in a second bandwidth smaller than the first bandwidth; and modulating the slot using a number of subcarriers corresponding to a number of scheduled resource blocks.

20 Claims, 7 Drawing Sheets

(56) References Cited

U.S. PATENT DOCUMENTS

| | | | | |
|---|---|---|---|---|
| 2017/0142751 A1* | 5/2017 | Liu | .................... | H04L 27/2613 |
| 2017/0238298 A1* | 8/2017 | Wang | ................ | H04W 72/1268 |
| | | | | 455/452.1 |
| 2019/0150187 A1* | 5/2019 | Park | ...................... | H04L 5/0094 |
| | | | | 370/330 |
| 2021/0377873 A1* | 12/2021 | Xu | ........................ | H04W 24/08 |
| 2022/0022147 A1* | 1/2022 | Lei | .................... | H04W 72/0453 |
| 2022/0217789 A1* | 7/2022 | Lee | .................. | H04W 74/0841 |
| 2023/0284226 A1* | 9/2023 | Roh | ...................... | H04L 1/0061 |
| | | | | 370/235 |

\* cited by examiner

SYSTEMS AND METHODS FOR BROADCAST CONTROL CHANNEL POWER BOOST SCHEDULING FOR WIRELESS COMMUNICATIONS BASE STATIONS

BACKGROUND

In wireless communication systems, downlink wireless communication signals carry both control channels and user channels. While the user channels serve as the transport to carry end user information (such as to carry voice and/or data communications traffic) between an operator network and user equipment (UE), control channels transport signaling, synchronization, and other system information for establishing and maintaining the wireless communications link between a base station and the UE. For example, in 4G LTE and 5G NR telecommunications systems, the Physical Broadcast Channel (PBCH) may be used to broadcast a Master Information Block (MIB) and System Information Block (SIB) from a base station to UE within the coverage area of the base station. The PBCH conveys downlink frame bandwidth information, and information that each UE uses to decode other information from other physical channels in the downlink frame. While the PBCH is designed to be detectable and decodable by a UE without prior information from the MIB, other physical channels are not. This makes reliable reception of the PBCH a requisite to establishing a robust wireless communications link between the base station and the UE. The Primary Synchronization Signal (PSS) and Secondary Synchronization Signal (SSS) are other examples of downlink broadcast channels, which are used by the UE to establish time domain frame, sub frame, slot and symbol synchronization, determine channel bandwidth center frequency, and establish the Physical layer Call Identity (PCI). In LTE, PSS and SSS are both broadcast twice during each downlink radio frame, within the same six Resource Blocks (RBs) as the PBCH, but during different timeslots and symbols.

A problem can arise, however, as the downlink frame bandwidth (and thus number of RBs per frame) is increased to accommodate increasing user channel capacity demands. For example, given a 1.4 MHz downlink LTE frame comprising 6 Physical Resource Blocks (PRBs), the RF transmit power allocated to each of those 6 PRBs is approximately ⅙ the of the radio's total RF transmit power. A 5 Mhz downlink frame comprising 25 PRBs spreads the same available total RF transmit power over the 25 PRBs, thus allocating each PRB approximately ¹⁄₂₅ the of the total RF transmit power. For a 20 MHz downlink frame, each of the 100 PRBs would only be allocate about 1% of the total RF transmit power. In other words, the power spectral density of the transmitted RF signal remains the same, but RF power available per resource block decreases with increasing frame bandwidth.

Given the diminishing RF power available per resource block as bandwidth increases to transmit downlink broadcast channels, a wireless communication link that was stable using a 1.4 Mhz downlink frame may struggle or fail to maintain the link for a 5 Mhz or larger downlink frame transmitted at the same total RF power because the power allocated to the downlink broadcast control channels (carrying the PBCH, PSS and/or SSS, for example) is no longer sufficient. In some circumstances, when a base station's bandwidth capacity is increased by system operators (from a 1.4 MHz to 5 MHz or greater bandwidth, for example), the radio head transmitter circuitry, such as the transmit path power amplifier (PA), may be upgraded as well to avoid the problem of diminished power per PRB. Upgrading the RF power capacity of the radio transmitter circuitry is not always a practical option, however. For example, the base station installation may be at a remote location with inadequate power sources available to operate more powerful transmitter equipment, or upgrading the transmitter equipment may not be technically possible or is otherwise cost prohibitive. In other cases, the base station radio transmitter may be embedded within an inaccessible system (for example, within an Earth orbiting satellite) where the transmit power of the RF transmitter may be limited by both the power rating of the radio circuitry and a lack of available power resources to operate at a higher RF power.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In some embodiments, solutions are provided that address the problem of communication link instability caused by poor reception of downlink broadcast control channels by UE within a coverage area of a base station. More specifically, the embodiments discussed herein present a Broadcast Channel Power Boost Scheduling (BCPBS) function. The BCPBS function provides a solution to the problem of diminishing RF power for transmitting downlink broadcast channels at higher downlink frame bandwidths through modified downlink resource block scheduling during subframe slots where downlink broadcast control channels are transmitted. During those slots where broadcast control channels are scheduled, the base station omits scheduling of traffic on one or more other resource blocks that are not used to carry the scheduled broadcast control channels. The base station modulate the downlink slot onto an RF signal using a number of subcarriers that corresponds to the number of scheduled resource blocks, which for those slots carrying broadcast control channels is less than the frame's full bandwidth of resource blocks. As a result, the available power spectral density is concentrated the on just the scheduled resource blocks, and thus an increase in RF power per resource block for transporting the broadcast control channels. In some embodiments, the BCPBS function restricts scheduling to only include resource blocks with downlink broadcast control channels during slots where downlink broadcast control channels are scheduled. In other embodiments, the reduction of the number of resource block scheduled in a slot can be selectively adjusted down to any number of resource blocks that realizes sufficient power boost to the broadcast control channels to form a stable communications link such that UE can receive and decode information from the broadcast control channels.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
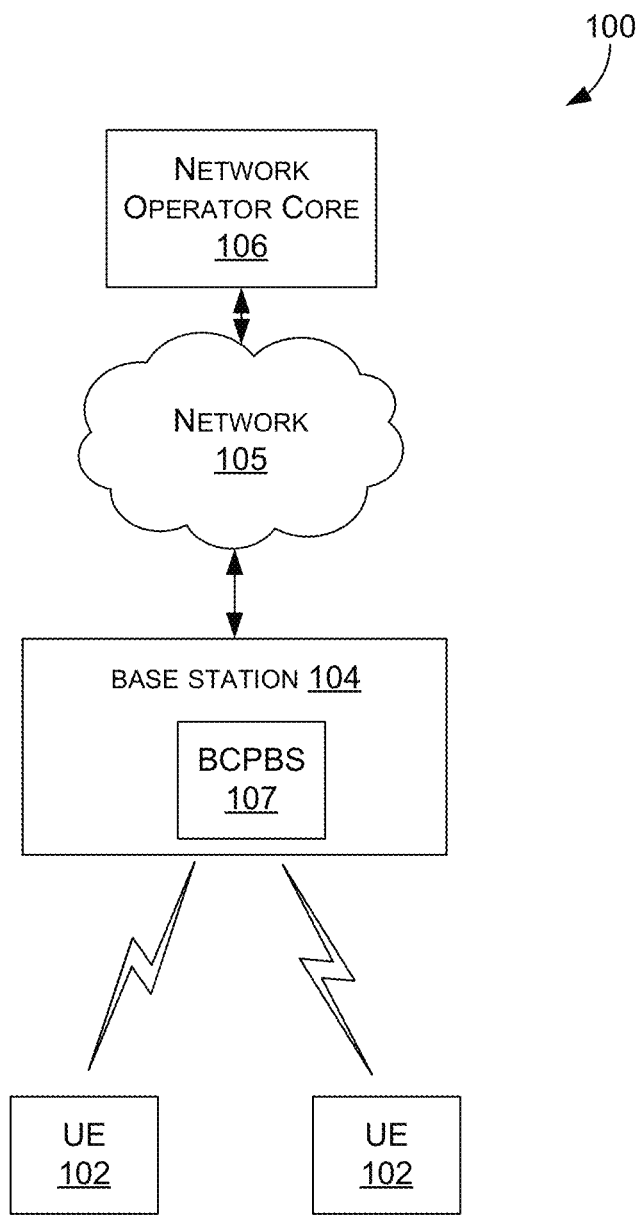
FIGS. 1 and 1A are diagrams illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, solutions that address the problem of communication link instability caused by poor reception of downlink broadcast control channels by UE within the coverage area of a base station. More specifically, the embodiments discussed herein present a Broadcast Channel Power Boost Scheduling (BCPBS) function. The BCPBS function provides a solution to the problem of diminishing RF power for transmitting downlink broadcast channels at higher downlink frame bandwidths by implementing modified downlink resource block scheduling during subframe slots where downlink broadcast control channels are transmitted. As used herein, a broadcast control channel refers to a channel that carries information broadcast into a coverage area and used by all UE for connecting to the base station. As such, a broadcast control channel is in contrast to a dedicated control channel that transmits dedicated UE specific control information between a UE and the base station.

In some embodiments, during slots where broadcast control channels are scheduled, the base station omits scheduling of traffic on one or more other resource blocks that are not used to carry the scheduled broadcast control channels. The base station will modulate that downlink slot onto an RF signal using a number of subcarriers that corresponds to the number of scheduled resource blocks, with the result that the available power spectral density is concentrated the on just the scheduled resource blocks. The resource blocks carrying broadcast control channels are therefore transmitted at a higher RF power per resource block than available during other slots of the frame where the frame's full complement of resource blocks are scheduled. The selective re-concentration of power delivers a boost or increase in RF power per resource block for transporting control channels such as the PBCH, PSS and/or SSS in slots where those downlink broadcast control channels are scheduled.

As an example, for a 5 MHz LTE downlink frame (having 25 PBRs), omitting transmission of all but the six PRBs carrying the PBCH, PSS and/or SSS yields a gain of approximately 6 dB. A power boost of just over 3× is realized for transmitting those six PRBs for the broadcast control channels. Although some downlink capacity for carrying user traffic is sacrificed by not utilizing the frame's full resource block capacity, the stability of the communication link itself is improved. Note that in some embodiments, the BCPBS function does not necessarily restrict scheduling to only include resource blocks with downlink broadcast control channels during. In some embodiments, the reduction of the number of resource block scheduled in a slot can be selectively adjusted down to any number of resource blocks that realizes sufficient power boost to the broadcast control channels to form a stable communications link (i.e. such that UE can receive and decode the information from the broadcast control channels).

FIG. 1 is a diagram illustrating an example network environment 100 embodiment in which the Broadcast Channel Power Boost Scheduling (BCPBS) function may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises a network operator core 106 that provides one or more wireless network services to one or more UE 102 via a radio access network (RAN) 104, often referred to as a base station 104. In the context of fourth generation (4G) Longer Term Evolution (LTE), the base station 104 may be referred to as an eNodeB, or eNB. In the context of fifth generation (5G) New Radio (NR), the base station 104 may be referred to as a gNodeB, or gNB. Other terminology may also be used depending on the specific implementation technology. In particular, each UE 102 communicates with the network operator core 106 via the base station 104 over one or both of uplink (UL) radio frequency (RF) signals and downlink (DL) RF signals. The base station 104 is coupled to the network operator core 106 by a backhaul network 105 that comprises wired and/or wireless network connections that may themselves include wireless relays and/or repeaters. In some embodiments, the base station 104 is coupled to the network operator core 106 at least in part by the Internet or other public network infrastructure. The network environment 100 is configured for wirelessly connecting the first UE 102 to other UEs 102 via the same base station 104, other base stations, or other telecommunication networks, such as network 105 or a publicly-switched telecommunication network (PSTN). Generally, each UE 102 is a device capable of unidirectional or bidirectional communication with radio units (also often referred to as radio points or wireless access points) of the base station 104 using radio frequency (RF) waves.

Figure 1A:
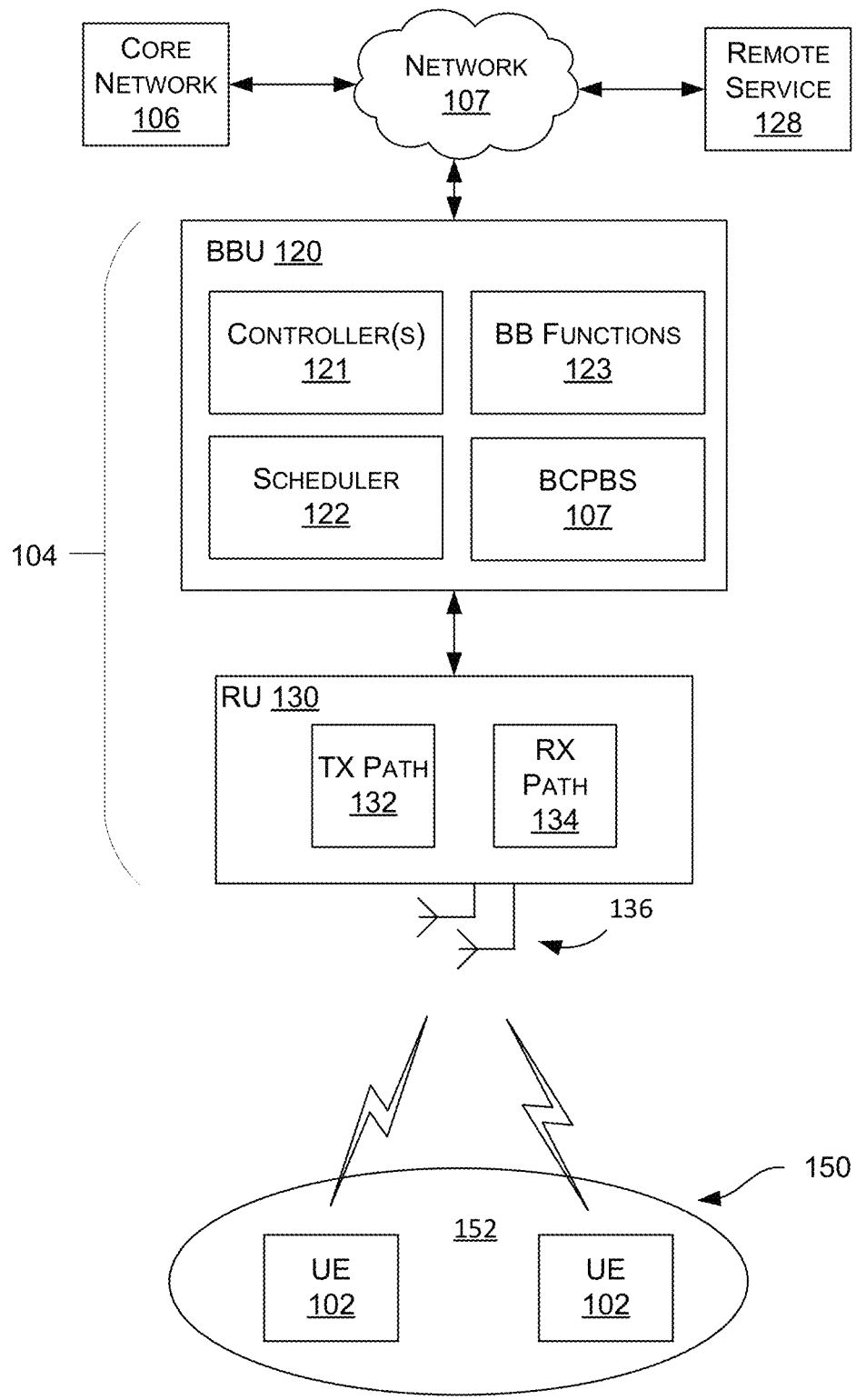

As illustrated in FIG. 1A, the base station 104 comprises at least one baseband unit (BBU) 120 coupled to a least one Radio Unit (RU) 130 through which the base station 104 serves a coverage area 150 that comprises at least one cell 152. The BBU 120 is comprises the circuitry and functionality to implement the air interface, and Open System Interconnection (OSI) Layer 1, Layer 2 and Layer 3 functions for the air interface. The RU 130 includes a radio head comprising transmit (TX) path 132 that includes radio transmitter circuitry (such digital-to-analog converters, one or more RF filters, frequency up-converters, and/or a Power Amplifier (PA)) and receive path (RX) 134 that includes radio receiver circuitry (such analog-to-digital converters, one or more RF filters, frequency down converters, and/or a Low Noise Amplifier (LNA).) The TX 132 and RX path 134 may be coupled to one or more antennas 136 by an appropriate coupler (such as a duplexer, for example). Via the antennas 136, downlink RF signals are radiated into the coverage area 150 for reception by the UEs 102, and uplink RF signals transmitted by the UEs 102 are received. The base station 104 may communicate with the UE 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the base station 104 may optionally support multiple air interfaces and/or multiple wireless operators.

As depicted in FIG. 1A, the BBU 120 may comprise one or more controllers 121 comprising a processor coupled to a memory and programed to perform one or more of the functions of the BBU 120 described herein. In some embodiments, the base station functions described herein may be executed by one or more controllers in a distributed manner utilizing one or more network functions orchestrated or otherwise configured to execute utilizing processors and memory of the one or more controllers. For example, where base station 104 comprises a gNodeB, the functions of the BBU 120 may be distributed between functional units comprising a Centralized Unit (CU) and at least one Distributed Unit (DU). As such, one or more functions of the base station described herein may be implemented by discrete physical devices or via virtual network functions.

The BBU 120 may be responsible for, among other things, digital baseband signal processing, for example to process uplink and downlink baseband signals, shown in FIG. 1A as Baseband (BB) function(s) 123. The BBU 120 further includes a scheduler 122 through which the BBU 120 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 122 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

As shown in FIG. 1A, the BBU 120 further implements the BCPBS function 107. In some embodiments, the BCPBS function 107 comprises a component of the scheduler 122. In other embodiments, the BCPBS function 107 is an independent module executed by the BBU 120 that interfaces with the scheduler 122, as further discussed herein. Regardless of how implemented, the BCPBS function 107 works in conjunction with the scheduler 122 and the RU 130 to boost power to resource blocks of downlink slots in which broadcast control channels are transmitted to the UE 102.

The network environment 100 is generally configured for wirelessly connecting UE 102 to data or services that may be accessible on one or more application servers or other functions, nodes, or servers (such as remote service 128). In some implementations, the remote service 128 serves as the originating server or servers for operating data (such as environmental data, traffic condition data, navigation and/or other operating commands) delivered to the UE 102 and/or utilized for operation of the UE 102. It should be understood that in some aspects, the network environment 100 may implement one or more features of the network operator core 106 within other portions of the network, or may not implement them at all, depending on various carrier preferences.

Figure 2:
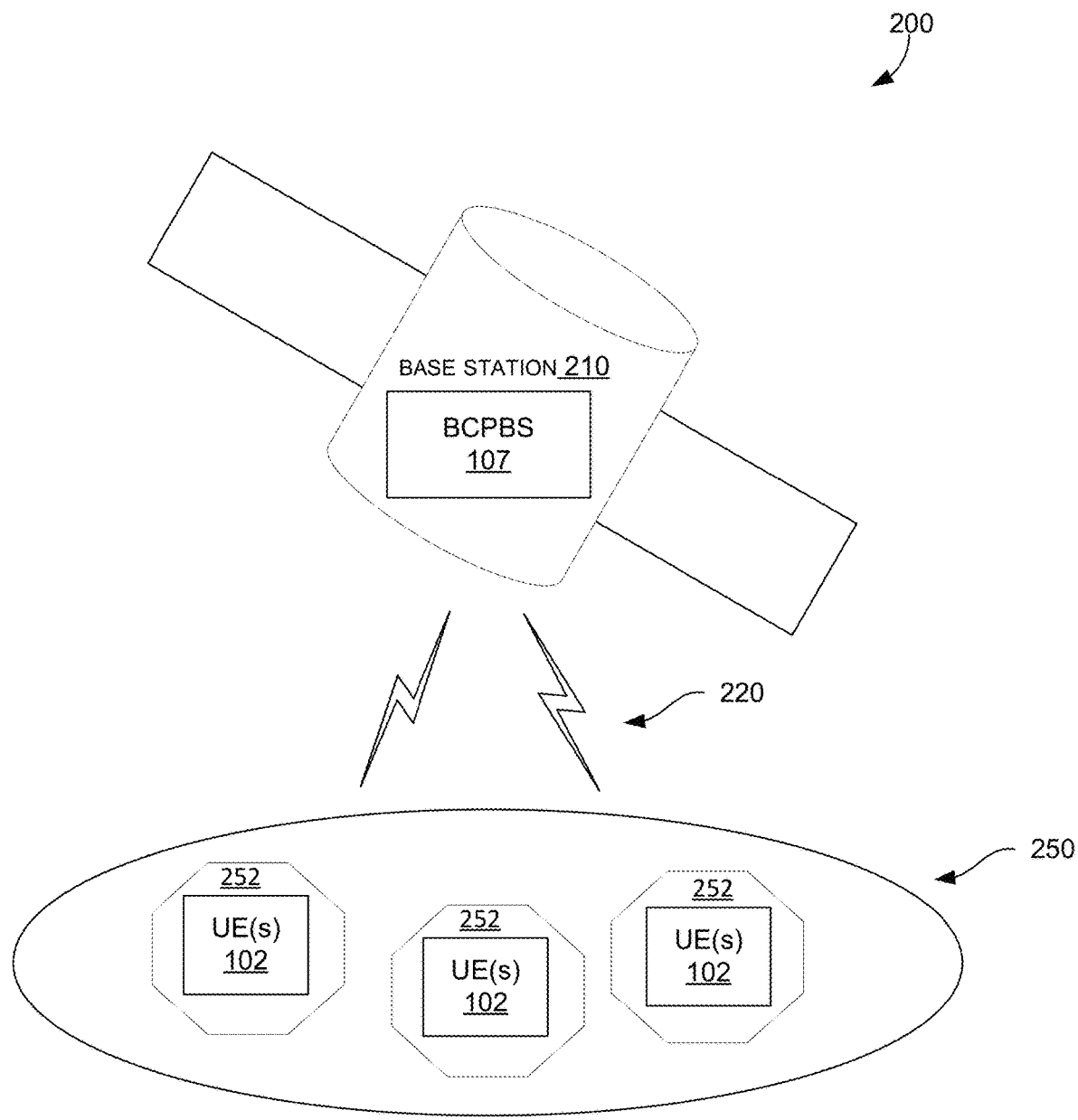
FIG. 2 is diagram illustrating a satellite comprising a wireless communication base station that implements a Broadcast Channel Power Boost Scheduling function, in accordance with some embodiments described herein.

FIG. 2 is a diagram illustrating generally at 200 an example base station 104 embodiment implemented as an Earth orbiting satellite base station 210 having a coverage area 250 in which a plurality of cells 252 are formed to provide wireless connectivity to the UE 102 within those cells 252. Base station 210 is one example of an implementation where radio transmitter hardware cannot be readily replaced and upgraded to facilitate increases in user traffic capacity. As discussed previously, increases in user traffic may be facilitated by increasing the bandwidth of downlink frames to carry additional resource blocks per subframe for allocation to the UE. If the transmitter power cannot be increased, then the power spectral density for transmitting downlink signals remains the same. The result is a net decrease in power per resource block, including those resource blocks carrying broadcast control channels. As such, a bidirectional communications link (shown at 220) with UE 102 that could be maintained with a 1.5 MHz downlink frame, may fail or be seriously degraded with a 5 MHz downlink frame. This is because the broadcast control channels may not be received by the UE 102 at a sufficient power level for the UE 102 to decode information from the broadcast control channels used to maintain the communication link 220. Similar constraints on transmitting downlink broadcast control channels may also occur when the orbiting base station 210 forms multiple coverage cells 252 and the number of cells 252 is increased. The increase in total number of resource blocks per subframe transmitted results in a decrease in power for the resource blocks carrying broadcast control channels because the power spectral density remains constant. Accordingly, the network operator may instruct the base station 210 to execute the Broadcast Channel Power Boost Scheduling (BCPBS) function 107. In one embodiment, for those slots of the downlink frame where broadcast control channels are scheduled, the BCPBS function 107 concentrates available RF power on transmitting resource blocks carrying the broadcast control channels by having the scheduler 122 forgo scheduling of one or more resource blocks of the frame that would not be carrying broadcast control channels. In some embodiments, the BCPBS function 107 causes the scheduler only to schedule transmission of resource blocks carrying broadcast control channels. The RU 130 of the base station 104 will modulate the downlink frame using a number of subcarriers corresponding to the number of scheduled resource blocks, thus concentrating the available power spectral density on just those scheduled resource blocks. As a results, the resource blocks carrying broadcast control channels to the UE 102 will be transmitted at a higher RF power per resource block than available during slots where the frame's full complement of resource blocks are scheduled.

In other embodiments, the BCPBS function 107 instead switches between standard frame bandwidths on a slot-byslot basis depending on when broadcast control channels are being transmitted. For example, given a 20 MHz downlink frame comprising 100 resource blocks per slot, the BCPBS function 107 may allocate resource blocks for slots where broadcast control channels are being transmitted as if it were a 5 Mhz downlink frame comprising 25 PRBs. In this way, the RF power per resource block for transmitting broadcast control channels is boosted, but without completely forgoing the scheduling of resource blocks not carrying broadcast control channels. The scheduler may then revert back to scheduling the full 20 MHz complement of resource blocks for subsequent slots when no broadcast control channels are scheduled.

Figure 3:
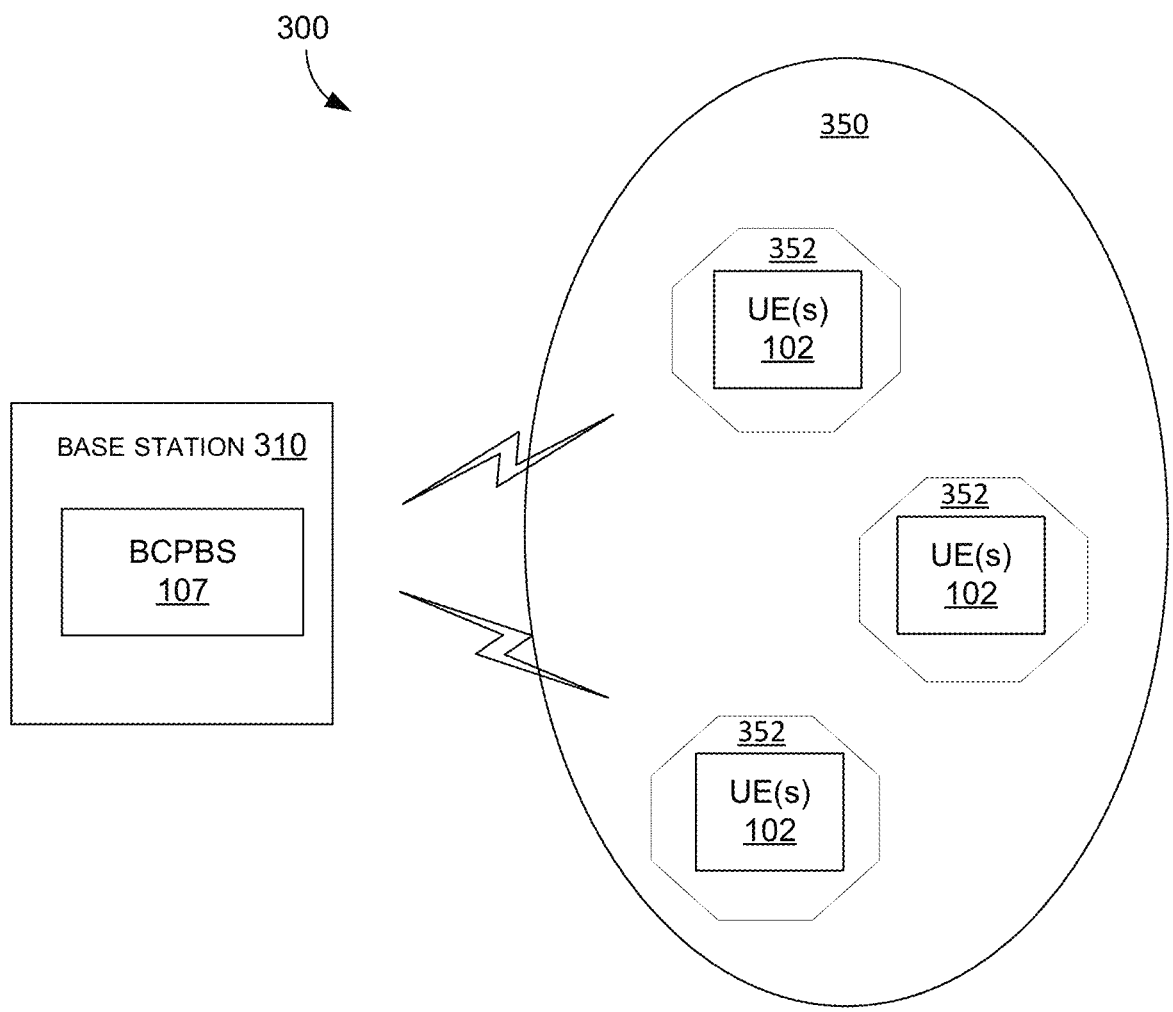
FIG. 3 is diagram illustrating a terrestrial a wireless communication base station that implements a Broadcast Channel Power Boost Scheduling function, in accordance with some embodiments described herein.

FIG. 3 is a diagram illustrating generally at 300 an example base station 104 embodiment implemented as terrestrial base station 310 having a coverage area 350 in which a plurality of cells 352 are formed to provide wireless connectivity to the UE 102 within those cells 352. Although access to the base station 310 may not be as limited as the case of Earth orbiting base station 210, there may still be circumstances placing constrains on increasing the available RF transmit power of base station 310. For example, the base station 310 may be located in a vault or other facility lacking the physical space and/or power utilities to support a more powerful base station deployment. Here, the base station 310 may execute the BCPBS function 107 in the same way as described with respect to the orbiting base station 210. That is, for slots of the downlink frame where broadcast control channels are scheduled, the available RF power is concentrated on transmitting resource blocks carrying the broadcast control channels. The scheduler 122 forgoes scheduling one or more resource blocks not carrying broadcast control channels during those slots. The base station 310 may then modulate that slot of the downlink frame using a number of subcarriers corresponding to the number of scheduled resource blocks, thus concentrating the available power spectral density on just those scheduled resource blocks. As a results, the resource blocks carrying broadcast control channels will be transmitted at a higher RF power per resource block than available during slots where the frame's full complement of resource blocks are scheduled. In some embodiments, the BCPBS function 107 causes the scheduler only to schedule transmission of resource blocks carrying broadcast control channels. The available RF power is thus concentrated on transmitting resource blocks carrying the broadcast control channels. In other embodiments, the BCPBS function 107 causes the scheduler 122 to schedule a reduced number of resource blocks in other ways. For example, in some embodiments, the BCPBS function 107 instead switches between standard frame bandwidths on a slot-by-slot basis depending on when broadcast control channels are being transmitted. The RF power per resource block for transmitting broadcast control channels is boosted, but without completely forgoing the scheduling of resource blocks not carrying broadcast control channels. Either way, the resource blocks carrying broadcast control channels will be transmitted at a higher RF power per resource block than available during slots where the frame's full complement of resource blocks are scheduled.

In some embodiments, a base station 104 may comprise the BCPBS function 107, but the BCPBS function 107 remains dormant or deactivated until such time that network operators issue a command to activate the BCPBS function 107, or the base station 104 receives other information triggering it to activate BCPBS function 107.

Figure 4:
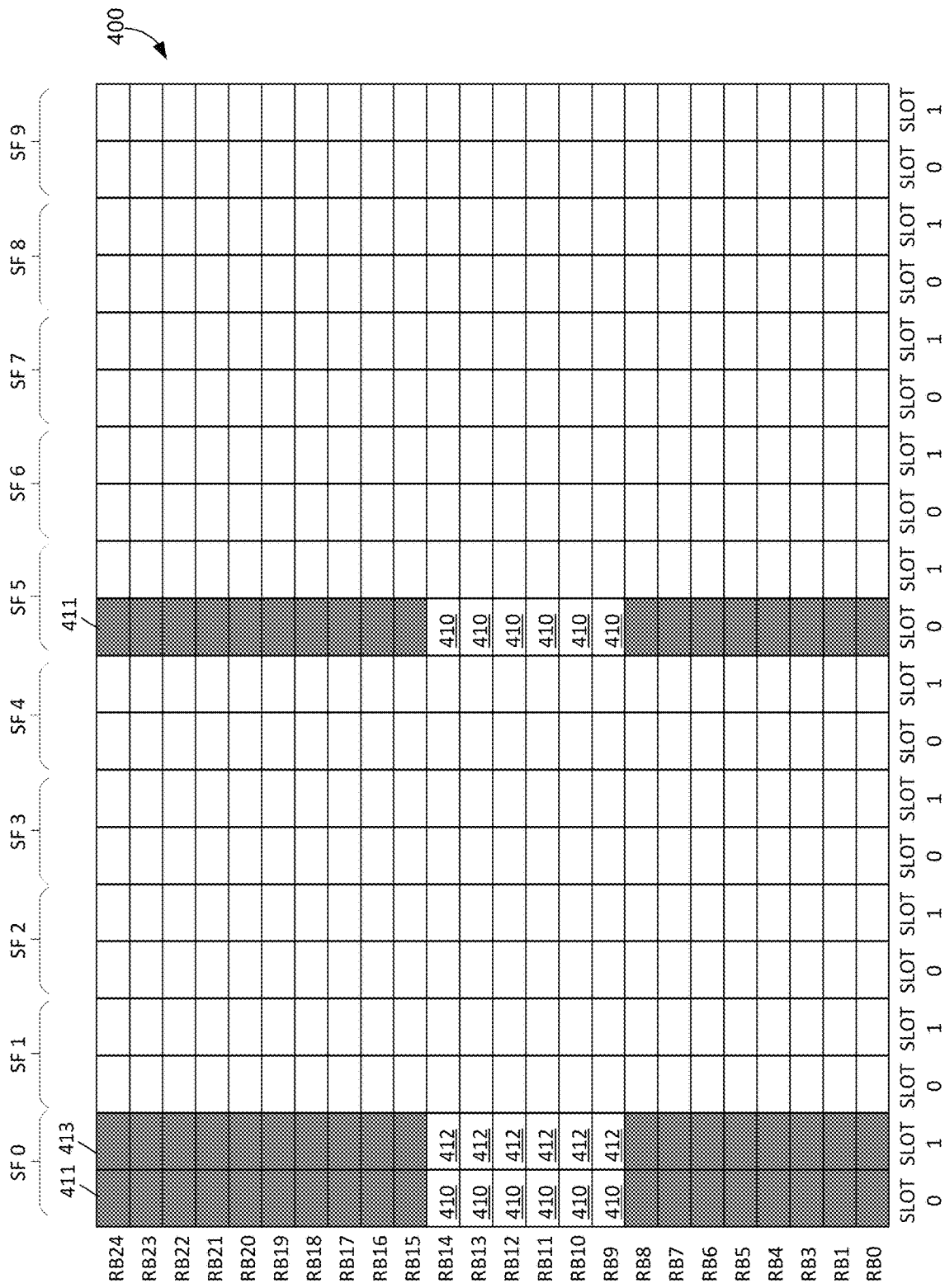
FIG. 4 is a diagram illustrating a wireless communication frame for which Broadcast Channel Power Boost Scheduling is implemented, in accordance with some embodiments described herein.

FIG. 4 illustrates an example structure for a downlink frequency division duplex (FDD) frame 400 transmitted by the base station 104 to UE 102. In this example, frame 400 comprises a 5 MHz bandwidth divided into 25 resource blocks (numbered RB0 to RB24). Each resource block comprises 12 subcarriers each 15 KHz wide in frequency. In the time domain, the frame 400 comprises 10 subframes (numbered 0 to 9), each subframe comprising two slots (numbered slot 0 and slot 1), and each slot comprising 7 OFDM symbols. It should be understood that frame 400 is provided for illustrative purposes and not intended as limiting. A downlink frame in other embodiments may comprise different resource block, subframe and/or slot configurations. For example, in some embodiments, frame 400 comprises a 4G LTE standard frame, while in other embodiments, from 400 comprises a 5G R standard frame. For example, a 5G NR RB may include 12 subcarriers, similar to an LTE RB, but the 5G NR RB is not fixed in frequency, but may depend on subcarrier spacing.

In this example frame 400, PSS and SSS broadcast control channels are scheduled for downlink transmission in RBs 9 to 14 of slot 0 in subframes 0 and 5 (indicated as resource blocks 410 and shown in the slots 411). Similarly, the PBCH broadcast control channel are scheduled for downlink transmission in RBs 9 to 14 of slot 1 in subframe 0 (indicated as resource blocks 412 and shown in slot 413). The BCPBS 107 determines when a slot includes resource blocks comprising broadcast control channels (such as slots 411 comprising RBs 410 and slot 413 comprising RBs 412), and when they do, the BCPBS 107 controls the scheduler 122 to schedule the RB9-14 comprising broadcast control channels, but to omit scheduling one or more of the RB0-8 and 15-24 during the slots 411 and 413. The base station 104 will modulate the downlink slots 411 and 413 across the 72 subcarriers that corresponds to the six scheduled resource blocks, RB 9-14. As a result, the available power spectral density is concentrated the on transmitting the scheduled resource blocks RB 9-14, rather than the full spectrum of RBs 0 to 24. During those slots 411 and 413, the resource blocks RB 9-14 carrying broadcast control channels are therefore transmitted at a higher RF power per resource block than available during other slots of the frame where the frame's full complement of 25 resource blocks are scheduled.

Figure 5:
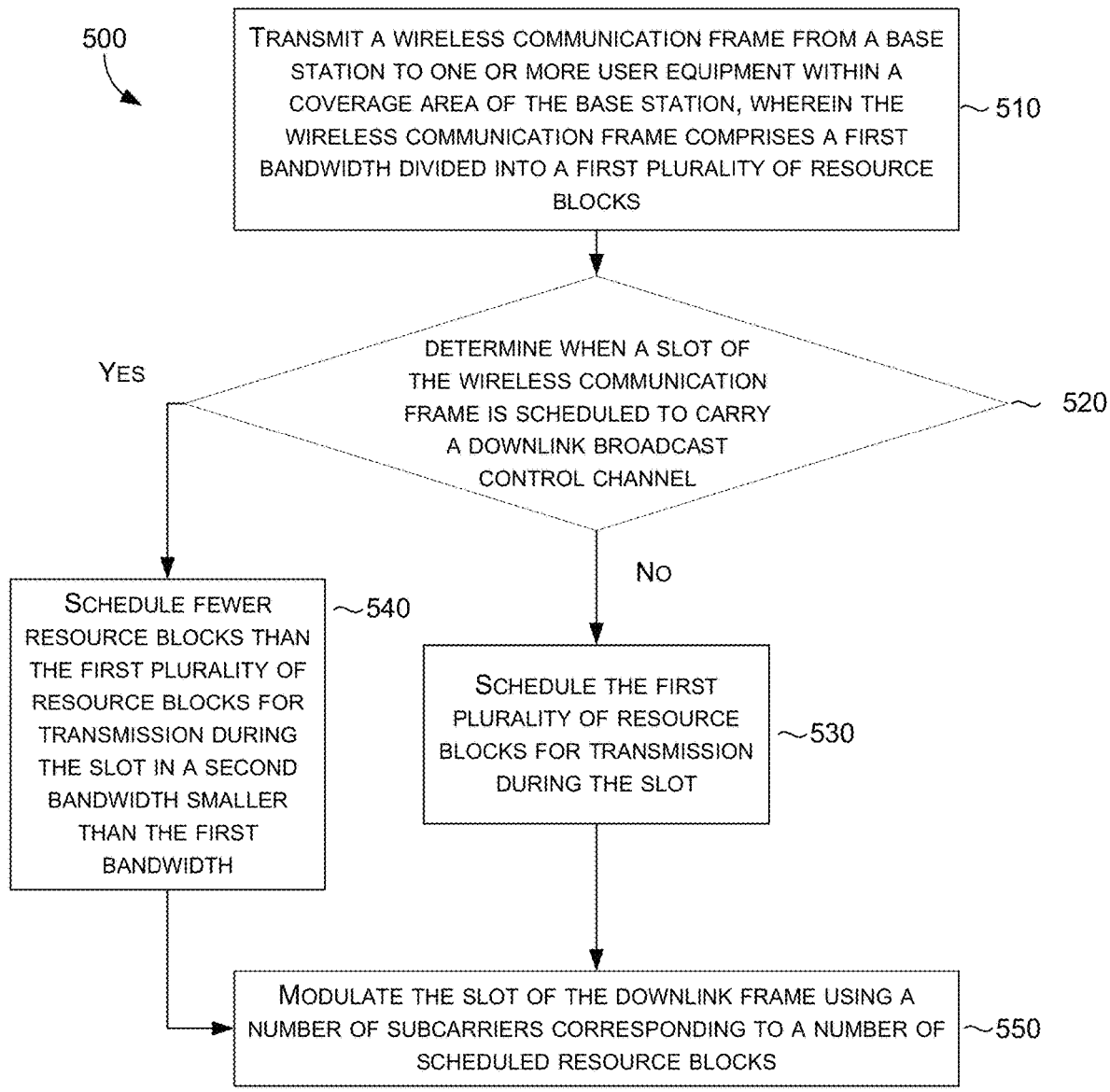
FIG. 5 is a flow chart illustrating a method for Broadcast Channel Power Boost Scheduling, in accordance with some embodiments described herein.

FIG. 5 is a flow chart illustrating an example method 500 for broadcast channel power boost scheduling of one embodiment. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 are implemented utilizing the scheduler 122 and/or BCPBS functions 107 of the BBU 120 as discussed herein.

Method 500 begins at 510 with transmitting a wireless communication frame from a base station to one or more user equipment within a coverage area of the base station, wherein the wireless communication frame comprises a first bandwidth divided into a first plurality of resource blocks. For example, the wireless communication frame may comprise a 3 MHz frame comprising 15 resource blocks, a 5 MHz frame comprising 25 resource blocks, a 10 MHz frame comprising 50 resource blocks, a 15 MHz frame comprising 75 resource blocks, or a 20 MHz frame comprising 25 resource blocks, or other frame configuration. The method 500 is not limited to any one air interface standard or wireless communication frame structure.

One or more slots of the downlink wireless communication frame include resource blocks that are scheduled for the broadcast of at least one downlink broadcast control channel. The method 500 therefore includes at 520 determining when a slot of the wireless communication frame is scheduled to carry a downlink broadcast control channel. Example downlink broadcast control channels within the context of 4G LTE and 5G NR include, but are not limited to, the PBCH, the PSS and the SSS.

When it is determined at 520 that when a slot of the wireless communication frame is not scheduled to carry the downlink broadcast control channel, the method 500 proceeds to 530 with scheduling the first plurality of resource blocks for transmission during the slot;

When it is determined at 520 that when a slot of the wireless communication frame is scheduled to carry the downlink broadcast control channel, the method proceeds to 540 with scheduling fewer resource blocks than the first plurality of resource blocks for transmission during the slot in a second bandwidth smaller than the first bandwidth;

The method proceeds to 550 with modulating the slot of the downlink frame using a number of subcarriers corresponding to a number of scheduled resource blocks. The base station will modulate the downlink frame using a number of subcarriers corresponding to the number of scheduled resource blocks, thus concentrating the available power spectral density on just those scheduled resource blocks. As a results, the resource blocks carrying broadcast control channels will be transmitted at a higher RF power per resource block than available during slots where the frame's full complement of resource blocks are scheduled.

As previously mentioned, in some embodiments, a base station 104 may comprise the BCPBS function 107 that is either is enabled full-time, or that is turned on or off based on commands received from a network operator. In other embodiments, the BCPBS function 107 may be automatically activated by a base station 104 in response to determining that UE 102 are not receiving and/or properly decoding broadcast control channels. For example, in some embodiments, the base station may receive a channel quality indicator from one or more UE 102 providing feedback about the channel quality in downlink. When the feedback provided by that channel quality indicator indicates that there may be interference or other issues degrading the quality of the broadcast control channel (for example, below a quality threshold), the base station 104 may activated the BCPBS function 107 until the problem negatively affecting the broadcast control channel subsides. In other embodiments, the base station 104 may infer that degradation of the broadcast control channel based on a collapse or loss of communication with one or more of the UE 102. Again, the base station 104 may activated the BCPBS function 107 until the problem negatively affecting the broadcast control channel subsides.

Figure 6:
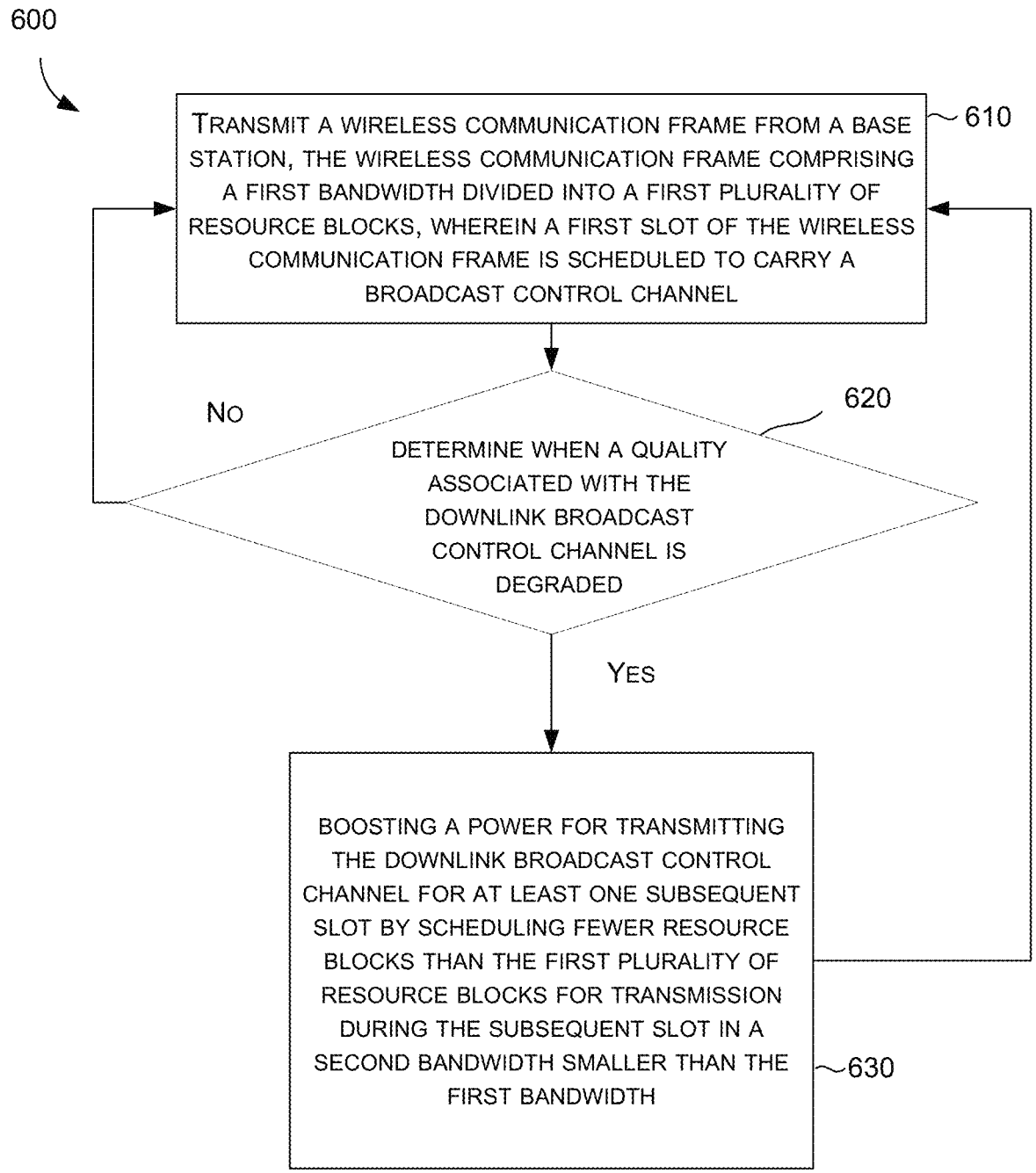
FIG. 6 is a flow chart illustrating a method for Broadcast Channel Power Boost Scheduling, in accordance with some embodiments described herein.

One such embodiment is illustrated in FIG. 6, in which a flow chart illustrates a method 600 for selective broadcast channel power boost scheduling. It should be understood that the features and elements described herein with respect to the method of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa.

The method 600 begins at 610 with transmitting a wireless communication frame from a base station, the wireless communication frame comprising a first bandwidth divided into a first plurality of resource blocks, wherein a first slot of the wireless communication frame is scheduled to carry a broadcast control channel. At 620, the method 600 determines when a quality associated with the downlink broadcast control channel is degraded. When the quality associated with the downlink broadcast control channel is degraded, the method 600 proceeds to 630 with boosting a power for transmitting the downlink broadcast control channel for at least one subsequent slot by scheduling fewer resource blocks than the first plurality of resource blocks for transmission during the subsequent slot in a second bandwidth smaller than the first bandwidth. As a results, the resource blocks carrying broadcast control channels will be transmitted at a higher RF power per resource block than available during slots where the frame's full complement of resource blocks are scheduled.

It should be noted that in some embodiments, the method 500 and the method 600 may be used in combination. That is, a base station 104 may have activated the BCPBS function 107 to run in steady-state to boost the power available for transmitting baseband control signals, but then implement method 600 to address short-term degradation of a broadcast control channel transmission. For example, in one embodiment, the base station 104 may operate with a 20 MHz frame, for which the method 500 reduces the bandwidth of those slots carrying a broadcast control channel to 15 MHz in order to boost the power for transmitting the broadcast control channel. That base station 104 may implement method 600 to further reduce the bandwidth of those slots carrying a broadcast control channel (to 5 MHz, for example) based on detected instances of degraded broadcast control channel quality, and then resume using the 15 MHz bandwidth for slots carrying the broadcast control channel once the degraded conditions clear.

In various alternative embodiments, system and/or device elements, method steps, or example implementations described throughout this disclosure (such as the base station, baseband unit (BBU), radio unit (RU), scheduler, BCPBS function, or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as base station, radio access network, network operator core, user equipment (UE), baseband unit (BBU), radio unit (RU), scheduler, BCPBS function, function, unit, node, module, and other terms derived from these words refer to the names of elements that would be understood by one skilled in the art of wireless telecommunications and related industries, and are not used herein as nonce words or nonce terms for the purpose of invoking 35 U.S.C. 112(f). The terms "function", "unit", "node" and "module" may also be used to describe computer processing components and/or one or more computer executable services being executed on one or more computer processing components.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for broadcast control channel power boost scheduling, the system comprising:
   at least one controller configured to execute one or more functions of a wireless communication base station, wherein the wireless communication base station is configured to communicate with one or more user equipment (UE) over one or both of uplink (UL) radio frequency (RF) signals and downlink (DL) RF signals, the one or more functions including:
   a broadcast control channel power boost scheduling function, wherein the broadcast control channel power boost scheduling function:
      determines when a slot of a downlink wireless communication frame is scheduled to carry a downlink broadcast control channel, the downlink wireless communication frame comprising a first bandwidth divided into a first plurality of resource blocks;
      when the slot of the downlink wireless communication frame is not scheduled to carry the downlink broadcast control channel, controls a scheduler to schedule fewer resource blocks than the first plurality of resource blocks for transmission during the slot in a second bandwidth smaller than the first bandwidth; and
      wherein the system modulates the slot onto a downlink RF signal using a number of subcarriers corresponding to a number of scheduled resource blocks.

2. The system of claim 1, wherein when the slot of the downlink wireless communication frame is not scheduled to carry the downlink broadcast control channel, the broadcast control channel power boost scheduling function controls the scheduler to schedule the first plurality of resource blocks for transmission during the slot.

3. The system of claim 1, wherein the downlink wireless communication frame comprises either a fourth generation (4G) Longer Term Evolution (LTE) frame, or a fifth generation (5G) New Radio (NR) frame.

4. The system of claim 1, wherein the broadcast control channel comprises one of: a Physical Broadcast Channel (PBCH), a Primary Synchronization Signal (PSS) channel, or a Secondary Synchronization Signal (SSS) channel.

5. The system of claim 1, wherein the system comprises the wireless communication base station in an Earth orbiting satellite or a terrestrial base station.

6. The system of claim 1, wherein the fewer resource blocks than the first plurality of resource blocks are each scheduled to carry the downlink broadcast control channel.

7. The system of claim 1, wherein the broadcast control channel power boost scheduling function further:
   determines when a quality associated with the downlink broadcast control channel is degraded; and
   when the quality associated with the downlink broadcast control channel is degraded, boosts a power for transmitting the downlink broadcast control channel for at least one subsequent slot by scheduling the fewer resource blocks than the first plurality of resource blocks.

8. The system of claim 7, wherein the quality associated with the downlink broadcast control channel is determined based on either feedback from the one or more UE, or inferred based on a loss of communication with the one or more UE.

9. The system of claim 1, further comprising a baseband unit (BBU) and at least one radio unit (RU) coupled to the BBU, wherein the broadcast control channel power boost scheduling function is executed by the at least one controller in the BBU.

10. The system of claim 1, wherein the broadcast control channel power boost scheduling function is implemented as via one or more virtual network function orchestrated on the at least one controller.

11. A method for broadcast control channel power boost scheduling, the method comprising:
   transmitting a downlink wireless communication frame from a base station to one or more user equipment (UE) within a coverage area of the base station, wherein the downlink wireless communication frame comprises a first bandwidth divided into a first plurality of resource blocks;
   determining when a slot of the downlink wireless communication frame is scheduled to carry a downlink broadcast control channel;
   when the slot of the downlink wireless communication frame is not scheduled to carry the downlink broadcast control channel, scheduling the first plurality of resource blocks for transmission during the slot;
   when the slot of the downlink wireless communication frame is scheduled to carry the downlink broadcast control channel, scheduling fewer resource blocks than the first plurality of resource blocks for transmission during the slot in a second bandwidth smaller than the first bandwidth; and modulating the slot of the downlink wireless communication frame using a number of subcarriers corresponding to a number of scheduled resource blocks.

12. The method of claim 11, wherein the base station comprises either a fourth generation (4G) Longer Term Evolution (LTE) eNodeB, or a fifth generation (5G) New Radio (NR) gNodeB.

13. The method of claim 11, wherein the downlink broadcast control channel comprises one of: a Physical Broadcast Channel (PBCH), a Primary Synchronization Signal (PSS) channel, or a Secondary Synchronization Signal (SSS) channel.

14. The method of claim 11, further comprising:

determining when a quality associated with the downlink broadcast control channel is degraded; and when the quality associated with the downlink broadcast control channel is degraded, boosting a power for transmitting the downlink broadcast control channel for at least one subsequent slot by scheduling the fewer resource blocks than the first plurality of resource blocks.

15. The method of claim 14, wherein the quality associated with the downlink broadcast control channel is determined based on either feedback from the one or more UE, or inferred based on a loss of communication with the one or more UE.

16. The method of claim 11, wherein transmitting a wireless communication frame comprises transmitting the slot of the downlink wireless communication frame from an Earth orbiting satellite to a terrestrial coverage area.

17. A wireless communication base station system, the system comprising:

at least one controller comprising one or more processing units comprising processing circuitry to:

control a radio unit to transmit a wireless communication frame to one or more user equipment (UE) within a coverage area, wherein the wireless communication frame comprises a first bandwidth divided into a first plurality of resource blocks;

determine when a slot of the wireless communication frame is scheduled to carry a downlink broadcast control channel;

when the slot of the wireless communication frame is scheduled to carry the downlink broadcast control channel, schedule fewer resource blocks than the first plurality of resource blocks for transmission during the slot in a second bandwidth smaller than the first bandwidth; and control the radio unit to modulate the slot onto a downlink radio frequency (RF) signal using a number of subcarriers corresponding to a number of scheduled resource blocks.

18. The system of claim 17, wherein when the slot of the wireless communication frame is not scheduled to carry the downlink broadcast control channel, the processing circuitry schedules the first plurality of resource blocks for transmission during the slot.

19. The system of claim 17, wherein the downlink broadcast control channel comprises one of:

a Physical Broadcast Channel (PBCH), a Primary Synchronization Signal (PSS) channel, and a Secondary Synchronization Signal (SSS) channel.

20. The system of claim 17, wherein the fewer resource blocks than the first plurality of resource blocks each are scheduled to carry the downlink broadcast control channel.

* * * * *